United States Patent
Liu

(10) Patent No.: US 6,814,365 B2
(45) Date of Patent: Nov. 9, 2004

(54) FITTING TYPE CHAINLESS TRANSMISSION AND SPEED ADJUSTMENT MECHANISM OF BICYCLE

(76) Inventor: Jen-Chih Liu, 2F., No. 468 Chien Kuo 1 Road, Kaohsiung (TW)

( * ) Notice: Subject to any disclaimer, the term of this patent is extended or adjusted under 35 U.S.C. 154(b) by 0 days.

(21) Appl. No.: 10/144,143

(22) Filed: May 10, 2002

(65) Prior Publication Data

US 2003/0209874 A1 Nov. 13, 2003

(51) Int. Cl.$^7$ .............................................. B62M 1/02
(52) U.S. Cl. ...................................... 280/260; 280/259
(58) Field of Search ................................ 280/259, 260, 280/262

(56) References Cited

U.S. PATENT DOCUMENTS

| 5,967,537 A | * | 10/1999 | Chang | 280/259 |
| 6,394,477 B1 | * | 5/2002 | Cellini | 280/260 |
| 6,478,323 B2 | * | 11/2002 | Chang | 280/260 |

* cited by examiner

*Primary Examiner*—Lesley D. Morris
*Assistant Examiner*—L. Lum
(74) *Attorney, Agent, or Firm*—Pro-Techtor International Services

(57) ABSTRACT

Fitting type chainless transmission and speed adjustment mechanism of bicycle which can be directly installed on an existent chain transmission bicycle to change the chain transmission bicycle into a chainless transmission bicycle without changing the bicycle frame. The front gear set is disposed at the pedals of the bicycle, including a driving gear and a driven gear engaged therewith. The axes of the driving and driven gears are positioned on different planes. The driven gear of the rear gear set is drivingly engaged with a transmission gear. The axes of the driven gear and transmission gear are positioned on different planes. The transmission gear is drivingly connected with output end of the speed adjustment mechanism. The input end of the speed adjustment mechanism is drivingly connected with the output end of the driven gear of the front gear set. The fitting type chainless transmission and speed adjustment mechanism of bicycle can be easily compatibly installed on an existent chain transmission bicycle to change the chain transmission bicycle without changing the bicycle frame.

10 Claims, 4 Drawing Sheets

FITTING TYPE CHAINLESS TRANSMISSION AND SPEED ADJUSTMENT MECHANISM OF BICYCLE

BACKGROUND OF THE INVENTION

The present invention is related to a cassette chainless transmission and speed adjustment mechanism of bicycle, which can be directly installed on an existent chain transmission bicycle to change the chain transmission bicycle into a chainless transmission bicycle without changing the bicycle frame.

All the above techniques are incompatible with the bicycle frames of the existent chain transmission bicycles. That is, the above chainless transmission mechanisms must be used in cooperation with exclusive independently designed bicycle frame. Therefore, these techniques cannot be directly applied to common chain transmission bicycles to change the bicycles into chainless transmission ones. Therefore, such techniques are not economical in industry and can be hardly effectively utilized.

Moreover, the input rotational speeds required by various bicycles are different from each other. With respect to the existent techniques, it is necessary to respectively manufacture various chainless transmission mechanisms with different input rotational speeds for selective installation. This leads to great investment cost in industry and great trouble in manufacturing, storage and installation.

Therefore, it is necessary to provide a cassette chainless transmission and speed adjustment mechanism of bicycle, which can be directly installed on an existent chain transmission bicycle to change the chain transmission bicycle into a chainless transmission bicycle without changing the bicycle frame. In addition, the cassette chainless transmission mechanism of bicycle is specified and the speed adjustment mechanism as a small part of the chainless transmission mechanism can be drawn and replaced to be easily selectively installed on different bicycles requiring different input rotational speeds.

SUMMARY OF THE INVENTION

It is therefore a primary object of the present invention to provide a cassette chainless transmission and speed adjustment mechanism of bicycle, which can be directly installed on a common chain transmission bicycle to change the bicycle into chainless transmission bicycle without changing the bicycle frame.

The cassette chainless transmission and speed adjustment mechanism of bicycle has simple structure and can be easily installed.

The cassette chainless transmission and speed adjustment mechanism of bicycle of the present invention can be easily manufactured and it is easy to change the chain transmission bicycle into chainless transmission bicycle.

The cassette chainless transmission mechanism of bicycle of the present invention is specified and the speed adjustment mechanism as a small part of the chainless transmission mechanism can be drawn and replaced to be easily selectively applied to different bicycles requiring different input rotational speed.

The cassette chainless transmission and speed adjustment mechanism of bicycle of the present invention can effectively promote economic value and profit of industry.

The cassette chainless transmission and speed adjustment mechanism of bicycle of the present invention enables an owner of a chain transmission bicycle to selectively change the bicycle into a chainless transmission bicycle.

The cassette chainless transmission and speed adjustment mechanism of bicycle of the present invention has low investment cost of industry and high economic value and utility.

The present invention can be best understood through the following description and accompanying drawings wherein:

DETAILED DESCRIPTION OF THE PREFERRED EMBODIMENTS

Figure 1:
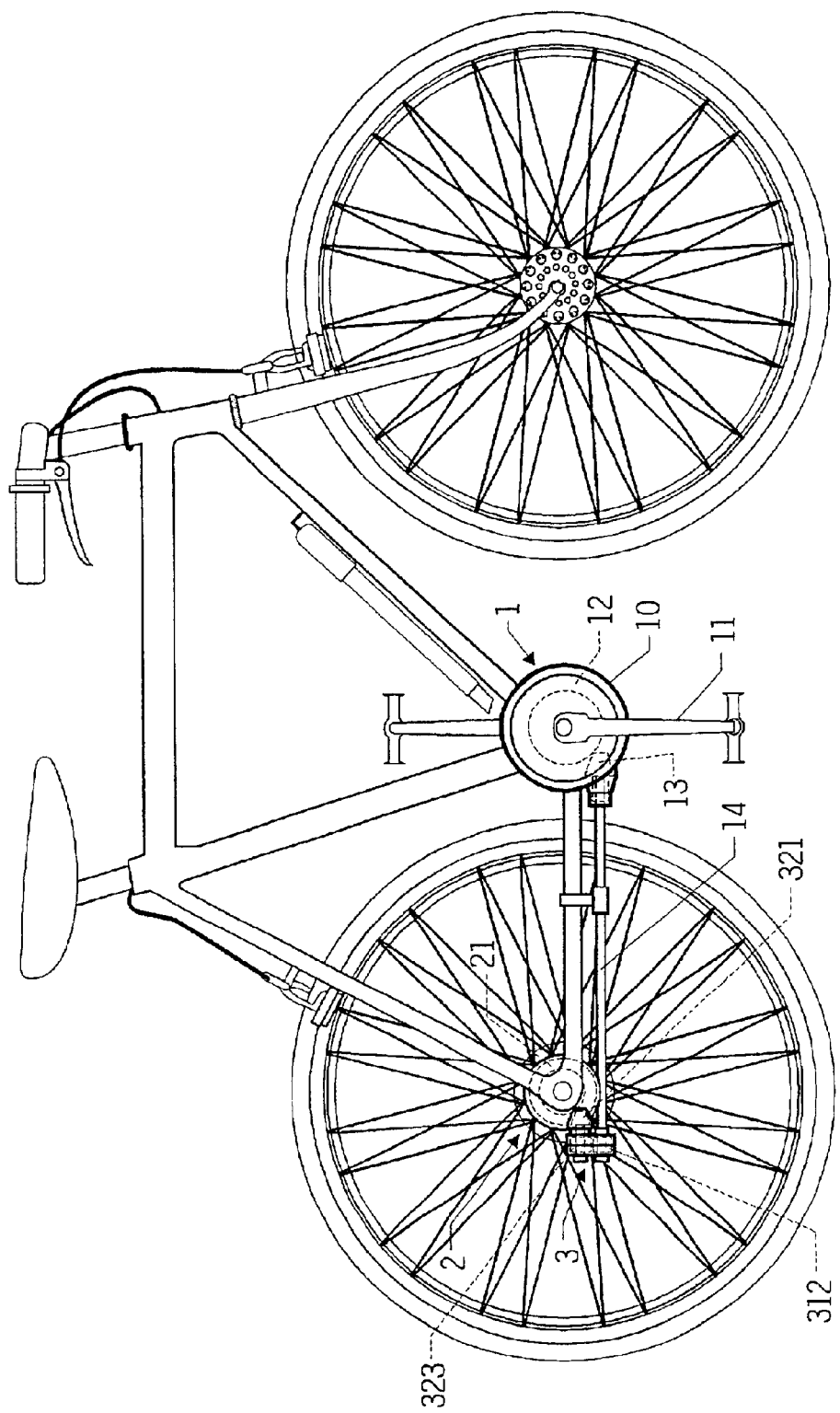
FIG. 1 is a view showing that the present invention is applied to a bicycle.
Figure 2:
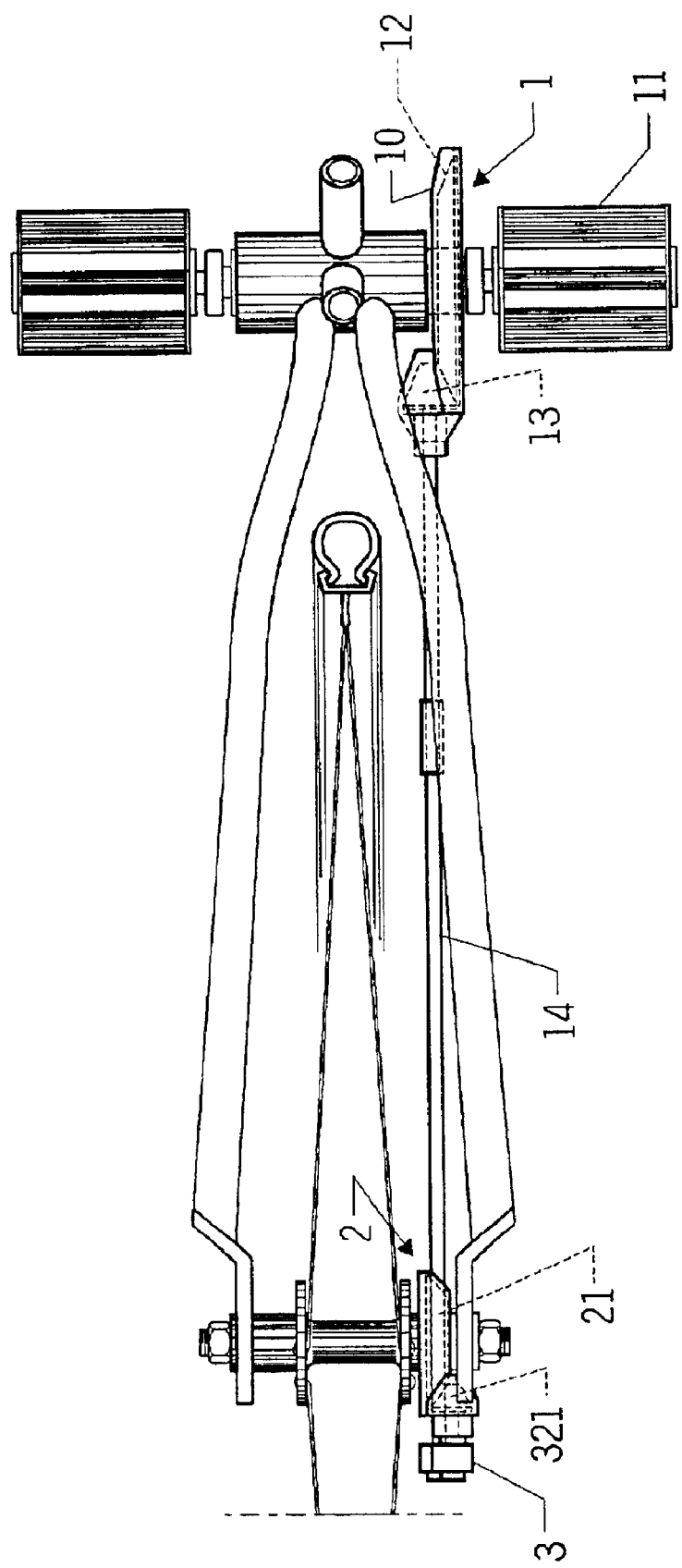
FIG. 2 is a top view of the present invention.
Figure 3:
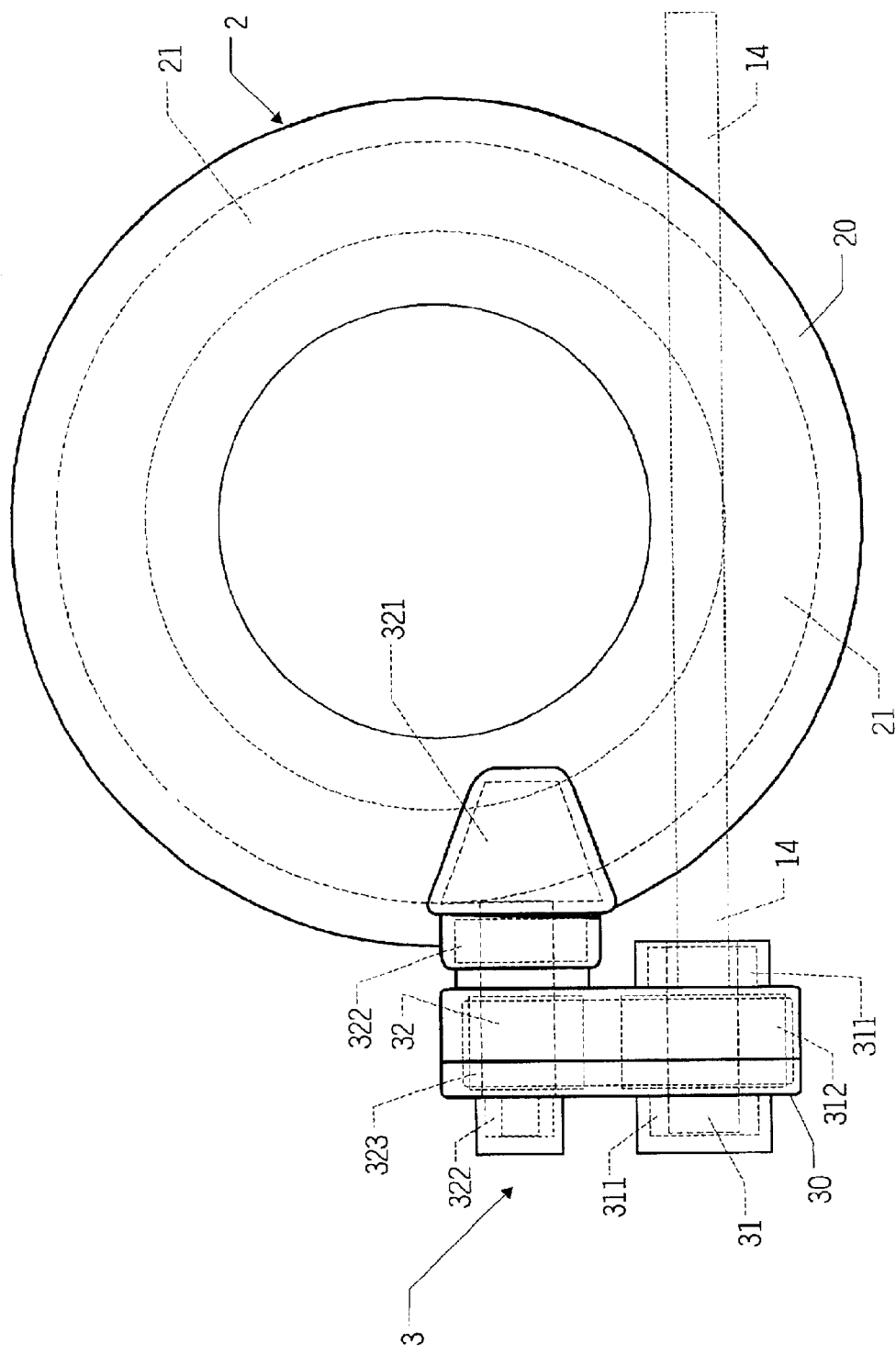
FIG. 3 shows an embodiment of the speed adjustment mechanism and rear gear set of the present invention.

Please refer to FIG. 1. The present invention includes a front gear set 1, a rear gear set 2 and a speed adjustment mechanism 3.

The front gear set 1 is disposed at the pedals of the bicycle, including a housing 10, a driving gear 12 disposed in the housing 10 and driven by the pedals 11 and a driven gear 13 disposed on back side of the driving gear and drivingly engaged therewith. The driving gear 12 can be a bevel gear or a face gear and the driven gear 13 can be a corresponding bevel gear or cylindrical gear. The output end of the driven gear 13 is drivingly connected to the rear gear set 2 via a transmission member 14. The transmission member 14 can be a flexible transmission member or rigid transmission member. The axes of the driving gear 12 and the driven gear 13 are positioned on different planes.

The rear gear set 2 includes a housing 20, a driven gear 21 disposed in the housing 20 and a speed adjustment mechanism 3 disposed outside the housing and communicated with the interior of the housing. The speed adjustment mechanism 3 has a housing 30 in which a transmission device is disposed. The transmission device includes a driven shaft 31. The input end of the driven shaft 31 is conducted to connect with the other end of the transmission member 14 and is driven by the output end of the driven gear 13 of the front gear set 1. A bearing 311 and a driving wheel 312 are mounted on the driven shaft 31. The driving wheel can be a gear, a sprocket or a pulley. The driving wheel 312 is drivingly engaged with or connected to a driven wheel 323 of another driven shaft 32 via a chain or a belt. One end of the driven shaft 32 is provided with a transmission gear 321 drivingly engaged with the driven gear 21 of the rear gear set 2. The transmission gear 321 can be a bevel gear or a cylindrical gear. The driven gear 21 of the rear gear set 2 is correspondingly a bevel gear or a face gear. In addition, a bearing 322 and a driven wheel 323 are disposed on the driven shaft 32. The driven wheel 323 is a gear, sprocket or pulley corresponding to the driving wheel 312 of the driven shaft 31.

The driving wheel 312 and the driven wheel 323 have a predetermined rotational speed ratio. With respect to different bicycles and in different conditions, it is unnecessary to change the front gear set 1 and rear gear set 2 and only it is necessary to replace the speed adjustment mechanism 3 in accordance with the required rotational speed ratio.

The axis of the driving gear 21 disposed in the housing 20 of the rear gear set 2 and the axis of the transmission gear 321 of the speed adjustment mechanism 3 are positioned on different planes.

Figure 4:
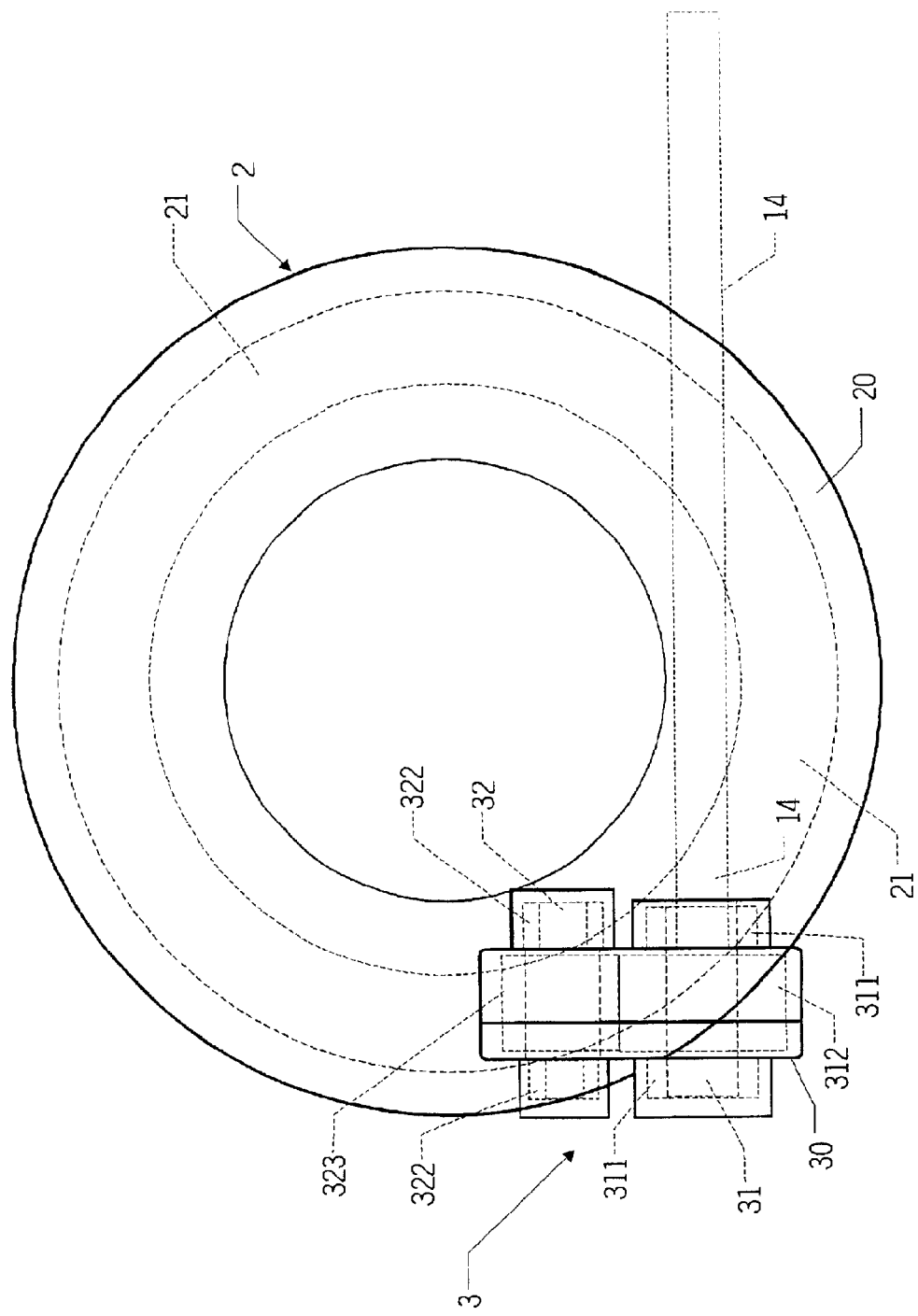
FIG. 4 shows another embodiment of the speed adjustment mechanism and rear gear set of the present invention.

FIG. 4 shows another embodiment of the present invention in which the input end of the driven shaft 31 of the transmission device of the speed adjustment mechanism 3 is connected to the other end of the transmission member 14 and driven by the output end of the driven gear 13 of the front gear set 1. A bearing 311 and a driving wheel 312 are disposed on the driven shaft 31. The driving wheel 312 can be a cylindrical gear drivingly engaged with a driven wheel 323 disposed on the other driven shaft 32 which driven wheel can be a cylindrical gear. The driven gear 323 is drivingly engaged with the driven gear 21 of the rear gear set 2 which driven gear is a face gear. In this embodiment, one gear is omitted so that the total weight of the speed adjustment mechanism is reduced and the cost is lowered.

According to the above arrangement, the cassette chainless transmission and speed adjustment mechanism of bicycle of the present invention has the following advantages:

1. The present invention can be directly installed on a common chain transmission bicycle to change the bicycle into chainless transmission bicycle without changing the bicycle frame.

2. The cassette chainless transmission and speed adjustment mechanism of bicycle of the present invention has simple structure and can be easily installed.

3. The cassette chainless transmission and speed adjustment mechanism of bicycle of the present invention can be easily manufactured and it is easy to change the chain transmission bicycle into a chainless transmission bicycle.

4. The cassette chainless transmission mechanism of bicycle of the present invention is specified and the speed adjustment mechanism as a small part of the chainless transmission mechanism can be drawn and replaced to be easily selectively applied to different bicycles requiring different input rotational speed.

5. The cassette chainless transmission and speed adjustment mechanism of bicycle of the present invention can effectively promote economic value and profit of industry.

6. The cassette chainless transmission and speed adjustment mechanism of bicycle of the present invention enables an owner of a chain transmission bicycle to selectively change the bicycle into a chainless transmission bicycle.

7. The cassette chainless transmission and speed adjustment mechanism of bicycle of the present invention has low investment cost of industry and high economic value and utility.

The above embodiments are only used to illustrate the present invention and one not intended to limit the scope thereof. Many modifications of the above embodiments can be made without departing from the spirit of the present invention.

What is claimed is:

1. A chainless transmission and speed adjustment mechanism of a bicycle, comprising:

a front gear set in communication with pedals of said bicycle, a rear gear set with a speed adjustment mechanism disposed thereon; wherein said front gear set comprises a driving gear driven by pedals of said bicycle and a driven gear engaged with said driving gear, said driving gear being a bevel gear or a face gear, said driven gear being a corresponding bevel gear or cylindrical gear, an output end of said driven gear is connected to said rear gear set via a transmission member, said transmission member being a flexible transmission member or a rigid transmission member, axes of said driving gear and said driven gear being positioned on different planes, said rear gear set includes a driven gear disposed in a housing and with said speed adjustment mechanism disposed outside said housing and in communication with an interior of said housing, an input end of said speed adjustment mechanism being connected to an output end of said driven gear of said front gear set, an output end of the speed adjustment mechanism being connected to said driven gear of said rear gear set, a transmission device is disposed in said speed adjustment mechanism, said transmission device including two driven shafts, with a driving wheel disposed on a first one of said driven shafts, said driving wheel being engaged with a driven wheel disposed on a second one of said driven shafts, one end of said second one of said driven shafts being provided with a transmission gear engaged with said driven gear of said rear gear set, said driving wheel and said driven wheel of said transmission device having a predetermined rotational speed ratio, an axis of said driving gear of the rear gear set and an axis of said transmission gear of said speed adjustment mechanism being positioned in different planes.

2. The chainless transmission and speed adjustment mechanism of a bicycle as claimed in claim 1, wherein:

said driving gear of said front gear set is a face gear or a bevel gear.

3. The chainless transmission and speed adjustment mechanism of a bicycle as claimed in claim 1, wherein:

said driven gear of said rear gear set is a face gear or a bevel gear.

4. The chainless transmission and speed adjustment mechanism of a bicycle as claimed in claim 1, wherein:

said transmission gear of the speed adjustment mechanism is a cylindrical gear or a bevel gear.

5. The chainless transmission and speed adjustment mechanism of a bicycle as claimed in claim 1, wherein:

said driven wheel of said speed adjustment mechanism is a gear or a sprocket or a pulley.

6. The chainless transmission and speed adjustment mechanism of a bicycle as claimed in claim 1, wherein:

said driving wheel of said speed adjustment mechanism is a gear or a sprocket or a pulley.

7. The chainless transmission and speed adjustment mechanism of a bicycle as claimed in claim 1, wherein:

said driving wheel and said driven wheel of said speed adjustment mechanism have a predetermined rotational speed ratio.

8. A chainless transmission and speed adjustment mechanism of bicycle, comprising:

a front gear set in communication with pedals of said bicycle, a rear gear set with a speed adjustment mechanism disposed thereon; wherein said front gear set comprises a driving gear driven by said pedals and a driven gear engaged with said driving gear, said driving gear being a bevel gear or a face gear, and the driven gear being a corresponding bevel gear or cylindrical gear, an output end of said driven gear is connected to said rear gear set via a transmission member, axes of said driving gear and said driven gear being in different planes, said rear gear set comprises a driven gear disposed in a housing and a speed adjustment mechanism disposed outside of said housing and in communication with an interior of said housing, an input end of said speed adjustment mechanism is connected to said output end of said driven gear of said front gear set, and an output end of said speed adjustment mechanism is connected to said driven gear of said rear gear set, a drawable and replaceable cassette transmission device is disposed in said speed adjustment mechanism, said transmission device including two driven shafts, a first one of said driven shafts being connected to said output end of said driven gear of said front gear set, a bearing and a driving wheel being disposed on said first one of said driven shafts, said driving wheel being engaged with a driven wheel disposed on a second one of said driven shafts, said driven wheel being engaged with said driven gear of the rear gear set.

9. The chainless transmission and speed adjustment mechanism of a bicycle as claimed in claim 8, wherein:

said driving wheel and said driven wheel of said speed adjustment mechanism have a predetermined rotational speed ratio.

10. The chainless transmission and speed adjustment mechanism of a bicycle as claimed in claim 8, wherein:

said driving wheel of said speed adjustment mechanism is a cylindrical gear, said driven wheel is a cylindrical gear, and said driven gear of said rear gear set is a face gear.

* * * * *